May 17, 1932. B. R. BENJAMIN 1,859,124
BUNDLE CARRIER FOR HARVESTERS
Original Filed Jan. 12, 1925  2 Sheets-Sheet 1
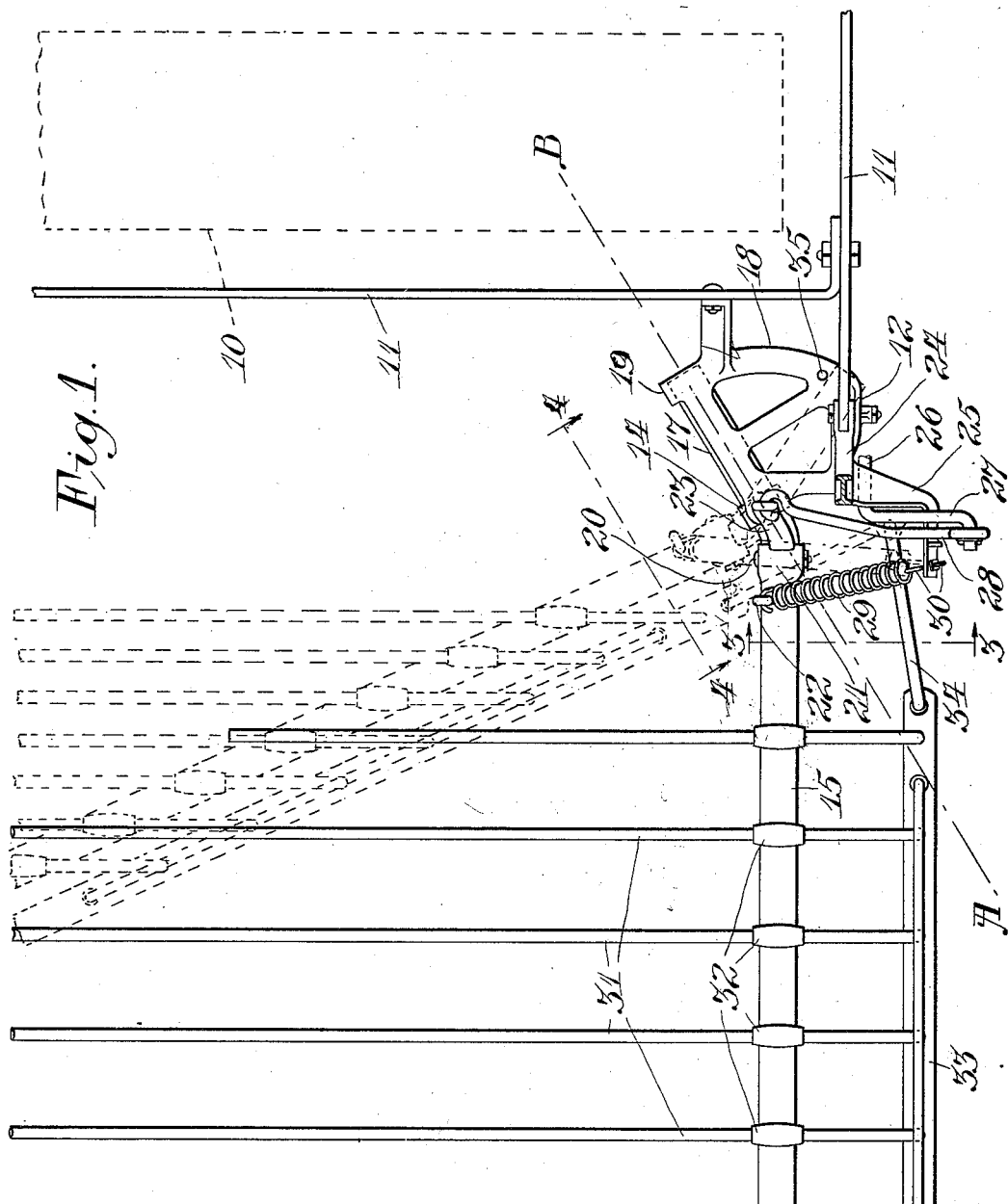
Inventor.
Bert R. Benjamin,
By H.P. Doolittle
Atty.

May 17, 1932. B. R. BENJAMIN 1,859,124
BUNDLE CARRIER FOR HARVESTERS
Original Filed Jan. 12, 1925   2 Sheets-Sheet 2
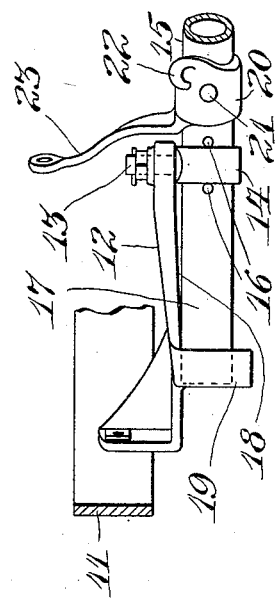
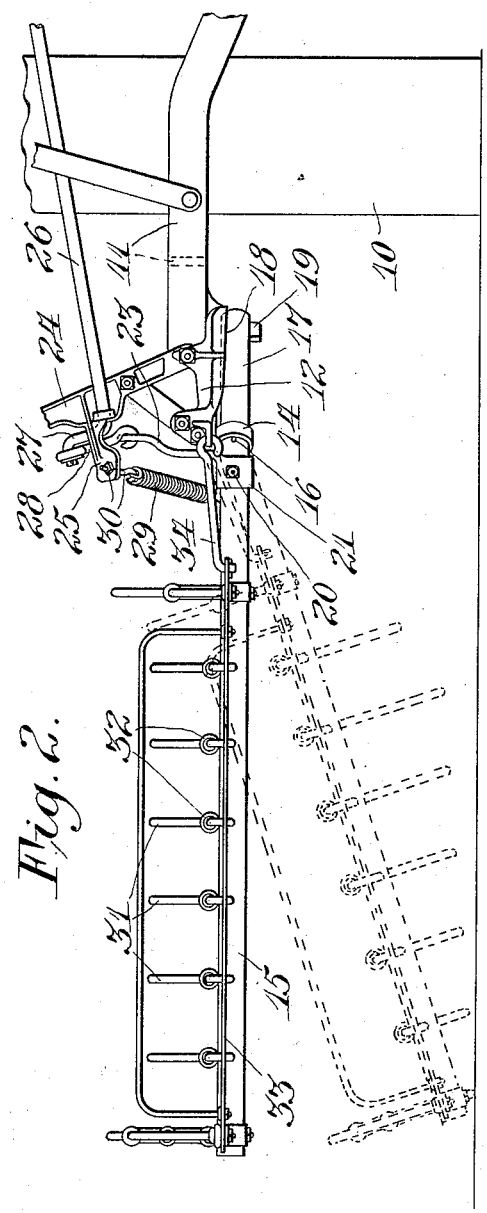
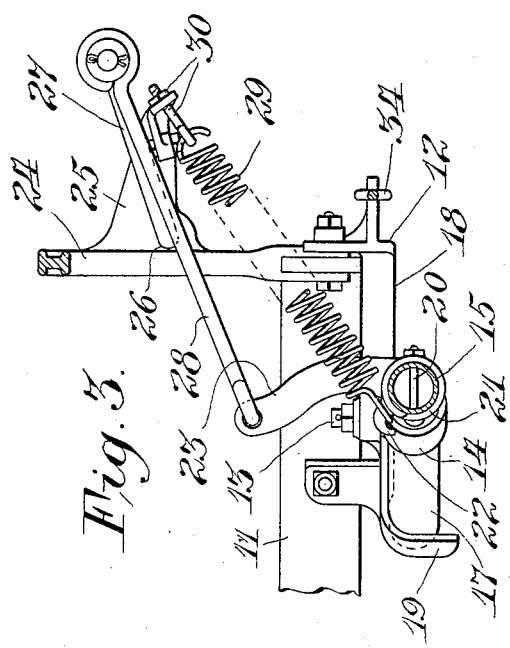
Inventor:
Bert R. Benjamin,
By H. P. Deriode
Atty.

Patented May 17, 1932

1,859,124

UNITED STATES PATENT OFFICE

BERT R. BENJAMIN, OF OAK PARK, ILLINOIS, ASSIGNOR TO INTERNATIONAL HARVESTER COMPANY, A CORPORATION OF NEW JERSEY

BUNDLE CARRIER FOR HARVESTERS

Substitute for application Serial No. 1,772, filed January 12, 1925. This application filed July 9, 1930.
Serial No. 466,895.

This invention has to do with harvesting machinery, such as grain binders, and particularly with bundle carrying attachments therefor. The present application is a substitute for my application Serial No. 1772 (series of 1925) filed January 12, 1925, allowed November 24, 1928, which has become abandoned.

These bundle carrying attachments are in the form of a basket or carrier mounted on the frame of a harvester in a position to receive bundles discharged from the sheaf binding mechanism of the harvester, and, when a sufficient load has accumulated thereon, they may be discharged or dumped to deposit the bundles in groups in the field. To be efficient, these carrier attachments should be so arranged that they may be easily and efficiently dumped so that there will be no dragging action of the carrier to scatter the bundles when the carrier is dumped; it should be of simple construction, easily controlled by the operator of the machine, and, lastly, it should not materially increase the draft of the harvester to which it is attached.

With these important points in mind, it is an object of this invention to provide a simply constructed and easily operable bundle carrying attachment for harvesting machines.

It is another object of this invention to provide a bundle carrier which will efficiently clean itself of the accumulated load when dumped without scattering the bundles.

It is another object of this invention to provide a bundle carrier which combines with a tilting movement of the carrier support also a simultaneous dropping movement of the support in such a manner that the tines of the carrier basket may engage the stubble floatingly, so that the stubble in the field may assist in cleaning or wiping the bundles from the carrier basket.

Other objects will appear to those skilled in this art as the description of the improved carrier progresses.

Briefly, these objects recited are accomplished by the construction of the present invention, the details of which embody a laterally extending bundle carrier support having an extension so mounted on the harvester frame that the extension may have a rocking or turning movement simultaneously with a turning and dropping movement in a line substantially at right angles to the line of draft of the harvester to dump an accumulated load of sheaves in the basket. An important feature of this invention is in the peculiar construction of the carrier support whereby the extension of the support moves on an axis which, if projected, is angularly spaced from the line of downward movement of the support proper.

In the accompanying sheets of drawings, the preferred example of the invention has been illustrated. Throughout these views, like characters of reference denote similar parts.

Figure 1 is a top plan view of a fragment of the harvester frame and a plan of the bundle carrying attachment of the present invention mounted thereon, the dotted lines in this figure showing the carrier in position folded along side of the harvester;

Figure 2 is a front elevational view of the construction shown in Figure 1, the dotted line position of the carrier being that which it assumes when discharging the sheaves;

Figure 3 is a view partly in elevation and partly in section of so much of the construction as would be seen when viewed in the direction of the arrows along the line 3—3 of Figure 1; and, Figure 4 is a detail view of the construction as viewed along the line 4—4 of Figure 1, looking in the direction of the arrows.

In the accompanying drawings is shown a main wheel 10 of a grain binding machine which supports in any conventional manner the harvester frame, embodying frame members 11 to which is attached the improved bundle carrier of this invention.

A substantially arcuate bracket 12 is bolted in any suitable manner to the frame members 11 of the harvester. Pivotally mounted on the far stubbleward side of this bracket is a vertical pin 13 which supports on the under side of the bracket a collar 14 which rockably and turnably carries intermediate of the ends thereof a laterally extending bundle carrier support 15. This support, as stated, passes through the collar 14 and is held therein against longitudinal movement with respect thereto by any means such as the oppositely disposed pins 16 (Figure 4). As shown in Figure 1 in the normal operative position of the carrier with respect to the harvester, it will be observed that the support 15 has an angular extension or bent portion 17, which is the part of the support carried by the collar 14, it passing therethrough with the end thereof contacting an arcuate track 18 on its under side and limited in its movement by a depending stop 19 at one end thereof. The support 15 adjacent its angular extension has fixed thereto, as by means of a bolt 20, a collar 21, which carries as integral parts thereof, a hook 22 and an upwardly extending, curved arm 23, which is provided with an eye at its upper end positioned directly over the pivotal point of the vertical pin 13 heretofore mentioned.

A releasable supporting mechanism and a manually actuable control mechanism are provided for the support as is usual in these attachments. For this purpose one of the frame members 11 has bolted thereto an upstanding bracket 24 provided near its upper end with a forwardly extending extension 25 in which is journaled the usual link 26 having the integral, forwardly extending, cranked portion 27 operatively connected to the releasing link 28 pivotally connected to the eye in the upper end of the arm 23. A yielding supporting means in the form of a spring 29 connects the integral hook 22 on the collar 21 with the extension 25, as shown in Figure 3, there also being provided any conventional form of tension take up for the spring, such as the screw and nut take up 30 shown.

The support 15 is normally retained in its raised, sheaf receiving position by the link 28 and the crank arm 27, which, as shown in Figure 3, move over their dead center position and lie against the extension 25. The spring 29, of course, also assists to maintain the support in its raised position. It will, of course, be understood that the link 26, as is conventional in these attachments, is connected by another link mechanism to a foot treadle (not shown) adjacent the seat of the operator on the harvester, where he may actuate these members to throw the crank 27 and link 28 out of their dead center position to push rearwardly on the arm 23 to rock and drop the support, with the assistance of the weight of an accumulated load of sheaves, to dump the same.

The carrier backet is made up of a plurality of longitudinally, rearwardly extending tines 31 carried in collars 32, which are pivoted for turning movement on the support 15. These tines also extend forwardly of the support, as shown in Figure 1, and are connected together by a bar 33 arranged parallel with the support 15, this bar being pivotally connected at its grainward end to the bracket 24 by means of a link 34.

From this description of structure it can readily be seen that for purposes of transport, where compactness is desired, or when an obstruction is encountered in the field, the support 15 and carrier basket thereon may swing rearwardly, as shown in the dotted line position in Figure 1, the tines remaining in longitudinal, parallel relationship in folded position alongside the harvester frame. This folded position is made possible because the support 15 is carried on the vertical pivot 13, the angular extension 17 traveling along the arcuate track 18 where it may be locked by dropping a pin through a hole 35 and held there against the tension of the spring 29, as shown in Figure 1. Of course, if only an obstruction is encountered, the spring will permit the necessary yield and return it to its normal transverse position to receive bundles from the harvester. The arrangement of the eye in the upper end of the arm 23 directly above the vertical pivot 13 permits this folding action without twisting the supporting and releasing mechanism described.

The operation of the mechanism of this bundle carrying attachment, it is thought, has been adequately described in connection with the description of the details of the mechanism and it is, therefore, not thought necessary to summarize this operation. One very important incident or feature of this construction still remains to be mentioned. It will be observed that the extension 17 of the support 15 is angularly disposed with respect to the support. Thus, a projected line representing the axis of turning movement of the extension 17 is always disposed away from or at an angle with respect to the line of dropping movement of the support 15 proper. Also, as the extension 17 rocks in its collar 14, a rocking movement is also imparted to the support 15 with a simultaneous dropping movement of the support 15 in such a manner that this support 15 describes a fragment of a conical surface in its downward movement.

In Figure 1, the line A—B represents the projected axis of the extension 17, or, as it may be called, the line of pivot of the support. By means of this construction, the support 15 is permitted a simultaneous rocking and dropping movement, the rocking movement tilting the basket downwardly for the purpose of making the tines engage the stubble, while the dropping movement is a gradually increasing dropping movement from the grainward end of the support 15 to the stubbleward end thereof, the maximum drop being at the stubbleward end because it is farthest from the point of pivot. It is believed that, by having the maximum drop at the extreme outer end of the support, a more efficient cleaning action through the contact of the basket tines with the stubble is attained. Also, when in released or dropped position, it will be appreciated that the support 15 and basket carried thereby, because of the spring 29, may yieldingly or floatingly conform to the surface of the field, which also insures a better contact of the sheaves in the basket with the stubble when discharging an accumulation of sheaves.

It will thus be seen that there is herein provided apparatus in which the several objects of the invention are achieved and that the same is of simple construction, yet dependable in action, and is well adapted to meet the exacting conditions of hard, practical use.

It is to be understood that various changes in form, construction and arrangement of parts may be resorted to by those skilled in this art without departing from the spirit of the invention as hereinafter claimed.

What is claimed as new is:

1. In combination, a frame, a carrier support including an angularly bent portion, means for rockably journaling said bent portion on the frame, carrier means on the support, and means for rocking the bent portion on a fixed axis whereby the support will have a downward movement along a line angularly spaced from the projected axis of the bent portion.

2. In combination, a frame, a laterally extending bundle carrier support, bundle carrying means mounted on the support, said support having an angularly and rearwardly bent extension mounted for rocking movement on the frame, and means for rocking the extension to move the support downwardly from its normal sheaf receiving position in a direction at right angles to the line of draft.

3. In combination, a frame, a carrier support including an angularly bent extension, carrier means on the support, and means rockably mounting the extension on the frame whereby the extension may be rocked on a fixed axis to drop the support in a line forming an angle with the projected axial line of rock of the extension.

4. In combination, a frame, a laterally extending bundle carrier support, bundle carrier means mounted on the support, the support having a rearward angularly bent part mounted for rocking movement on a horizontal axis on the frame, said support being movable in a downward direction from its normal sheaf receiving position in a position to the rear of the projected axial line of the bent part.

5. In combination, a frame, a support having an angularly bent extension mounted for rocking movement on a horizontal axis on the frame, carrier means on the support, and means for dropping the support and carrier from its normal position to dump the load by rocking the extension.

6. In combination, a frame, a laterally extending bundle carrier support, bundle carrier means mounted on the support, the support having an angularly bent end mounted for rocking movement on the frame, and means connected to the support for rocking the bent end to drop the support and carrier with a tilting movement from its normal position to dump the load.

7. In combination, a frame, a support having an angularly bent extension mounted for rocking movement on the frame, carrier means on the support, a member fixed to the support, and means for moving said member to rock the extension and tilt the support to drop it in a downward direction from its normal position to dump a load carried on the carrier means.

8. In combination, a frame, a laterally extending bundle carrier support, bundle carrier means mounted on the support, the support having an angularly bent end mounted for rocking movement on the frame, an arm fastened to the support, and means for rocking the arm and bent end to tilt the support and drop it in a downward direction from its normal position to dump the load.

9. In a bundle carrying attachment for harvesters having a frame, the combination of a laterally extending carrier member having an angularly bent end rockably connected to the frame, and said member being movable downwardly with a tilting action along its axis and along a line spaced angularly away from the projected axial rocking line of movement of its bent end connection to the frame.

10. In a harvester having a frame, a bundle carrying attachment therefor, comprising a laterally extending member connected to the frame for a rocking movement, and being movable downwardly along a line disposed at an angle with the projected line of the rocking connection of the support to the frame.

11. In combination, a frame, a carrier support having a bent end disposed at an obtuse angle to the support, said bent end mounted for rocking movement on a horizontal axis on the frame, a carrier on the support, means for locking the support and carrier in a raised position, and means on the support for releasing said locking means and rocking the bent end to dump the load by dropping the support downwardly.

12. In combination, a frame, a carrier support having an angularly bent end mounted for rocking movement on a horizontal axis on the frame, a carrier on the support, means for locking the support and carrier in normal sheaf receiving position, and means for releasing the locking means to dump the carrier by rocking the bent end and dropping the support downwardly along a line angularly spaced from the axial line of movement of the extension.

13. In combination, a frame, a carrier support having an angularly bent end mounted for rocking movement on the frame, a carrier on the support, the support having both a tilting and downward movement, and means for folding the support and carrier inwardly alongside the frame.

14. In combination, a frame, a laterally extending carrier support having an angularly bent end mounted for rocking movement on the frame, a carrier on the support, means for rocking and dropping the support and carrier in a downward direction along a line substantially at right angles to the line of draft, and means for folding said support and carrier inwardly alongside said frame.

15. In a bundle carrying attachment for harvesters having a frame, the combination of a laterally extending carrier support rockably mounted on the frame, means for locking the support and carrier in a raised position for receiving sheaves, means for releasing said locking means and dropping and rocking the support to dump the sheaves, and means whereby the line of dropping movement will be disposed at an angle with the projected axial line of rocking movement of the support.

16. In a harvester having a frame, a bundle carrying attachment therefor, said attachment comprising a laterally extending angularly bent support mounted for a rocking movement on a fixed axis on the frame and movable downwardly along a line disposed at an angle away from the projected axial line of rocking movement of the support.

17. In a harvester having a frame, a bundle carrying attachment therefor, said attachment comprising a laterally extending angularly bent support mounted for a rocking movement on a fixed axis on the frame and movable downwardly along a line disposed at an angle away from the projected line of rocking movement of the support, means for locking the support in a raised position, and means for releasing the locking means to rock and drop the support.

18. In a harvester having a frame, a bundle carrying attachment therefor, said attachment comprising a laterally extending support including a portion mounted for a rocking movement on the frame and another portion movable downwardly along a line disposed at an angle with respect to the projected line of rocking movement of the first portion, and means on the support for rocking and dropping the support to dump the load.

19. In combination, a harvester frame, a bundle carrier including a laterally extending support and bundle carrying means mounted on said support, and an elongated extension on the support rockably mounted on the harvester frame on a maintained horizontal axis whereby a combined dropping and rotary movement about the axial line of rock of the extension may be simultaneously imparted to the support and bundle carrying means.

20. In combination, a frame, a bundle carrier including a support having an angularly disposed elongated straight end turnably mounted in a journal on the frame, means normally retaining the support in elevated position, means for releasing said means, and means for returning the support to its normal position after it has been released.

21. In combination, a frame, a bundle carrier including a support, means for retaining the support in elevated position, and an integral angular extension on the support and turnably mounted on the frame on a maintained horizontal axis whereby when the support is released it will describe a conical surface.

22. In combination, a frame, a bracket including an arcuate track mounted on the frame, and a bundle carrier including a support turnably mounted intermediate of its ends on the bracket with one end engaging the track in such a manner that the support may have both a rocking and dropping movement to dump the load on the carrier.

23. In combination, a frame, a bracket including an arcuate track mounted on the frame, and a foldable bundle carrier including a support having an angular extension engaging the track and vertically pivoted on the bracket in such a manner that the track forms a guide for the end of the support when folding it alongside the frame.

24. In a harvester having a frame, the combination of a bundle carrier comprising an integral support having an elongated angularly bent end, and means for turnably mounting said bent end on a horizontal axis on the frame to cause a dropping of the support when the bent end is turned.

In testimony whereof I affix my signature.

BERT R. BENJAMIN.